United States Patent
Bang (10) Patent No.: US 7,506,208 B2
(45) Date of Patent: Mar. 17, 2009

(54) APPARATUS AND METHOD FOR CRISIS RECOVERY

(75) Inventor: You Sok Bang, Ansung-si (KR)

(73) Assignee: LG Electronics Inc., Seoul (KR)

( * ) Notice: Subject to any disclaimer, the term of this patent is extended or adjusted under 35 U.S.C. 154(b) by 462 days.

(21) Appl. No.: 11/108,633

(22) Filed: Apr. 19, 2005

(65) Prior Publication Data

US 2006/0015711 A1    Jan. 19, 2006

(30) Foreign Application Priority Data

Jul. 12, 2004    (KR) ...................... 10-2004-0054037

(51) Int. Cl.
G06F 11/00    (2006.01)

(52) U.S. Cl. ............................ 714/36; 713/2

(58) Field of Classification Search .............. 713/2; 714/36

See application file for complete search history.

(56) References Cited

U.S. PATENT DOCUMENTS

| | | | | |
|---|---|---|---|---|
| 5,297,286 | A * | 3/1994 | Uehara | 713/1 |
| 5,398,333 | A * | 3/1995 | Schieve et al. | 714/36 |
| 5,463,766 | A * | 10/1995 | Schieve et al. | 713/2 |
| 5,835,761 | A * | 11/1998 | Ishii et al. | 713/100 |
| 5,870,520 | A * | 2/1999 | Lee et al. | 714/6 |
| 6,003,130 | A | 12/1999 | Anderson | 713/2 |
| 6,122,733 | A * | 9/2000 | Christeson et al. | 713/2 |
| 6,161,177 | A * | 12/2000 | Anderson | 713/2 |
| 6,175,919 | B1 * | 1/2001 | Ha | 713/100 |
| 6,442,623 | B1 * | 8/2002 | Kim | 710/8 |
| 6,523,133 | B2 * | 2/2003 | Shin'ichi et al. | 714/15 |
| 6,647,512 | B1 | 11/2003 | James et al. | 714/36 |
| 6,715,106 | B1 * | 3/2004 | Mermelstein | 714/36 |
| 6,920,553 | B1 * | 7/2005 | Poisner | 713/2 |
| 6,934,873 | B2 * | 8/2005 | Lu et al. | 714/2 |
| 7,069,431 | B2 * | 6/2006 | Dayan et al. | 713/2 |
| 7,069,472 | B2 * | 6/2006 | James et al. | 714/36 |
| 7,100,087 | B2 * | 8/2006 | Yang et al. | 714/36 |
| 7,111,159 | B2 * | 9/2006 | Stein et al. | 713/1 |
| 7,136,994 | B2 * | 11/2006 | Zimmer et al. | 713/2 |
| 7,143,275 | B2 * | 11/2006 | Cepulis et al. | 713/1 |
| 7,188,278 | B1 * | 3/2007 | Diaz et al. | 714/36 |
| 7,406,591 | B2 * | 7/2008 | Rothman et al. | 713/2 |
| 2002/0162052 | A1 * | 10/2002 | Lewis | 714/36 |
| 2003/0221096 | A1 * | 11/2003 | Wada | 713/2 |

(Continued)

OTHER PUBLICATIONS

Chinese Office Action dated Jan. 26, 2007.

Primary Examiner—Robert Beausoliel
Assistant Examiner—Joshua P Lottich
(74) Attorney, Agent, or Firm—KED & Associates, LLP (57) ABSTRACT

Embodiments of an apparatus and method for recovering a system from system crisis can start a crisis recovering routine by pressing a prescribed button (e.g., existing power button) for a predetermined time when the system is not started or abnormally operated. Embodiments can recover a ROM BIOS by reading information for crisis recovering routine from a memory in the system or from an external storage device. Accordingly, the ROM BIOS is recovered without additional operations of key input or additional keys by setting the information of starting the emergency recovering routine in the memory when the power button is activated, and the system can be recovered from the system crisis by performing POST operations based on the recovered ROM BIOS.

12 Claims, 6 Drawing Sheets

U.S. PATENT DOCUMENTS

| | | | |
|---|---|---|---|
| 2004/0025002 A1* | 2/2004 | Cepulis et al. | 713/2 |
| 2004/0073842 A1* | 4/2004 | James et al. | 714/36 |
| 2004/0230788 A1* | 11/2004 | Zimmer et al. | 713/2 |
| 2005/0039081 A1* | 2/2005 | Chang et al. | 714/36 |
| 2005/0060530 A1* | 3/2005 | Lin | 713/2 |
| 2006/0005004 A1* | 1/2006 | First et al. | 713/2 |

* cited by examiner

| 403 — | Block n...<br>n+1 | -O/S, Application<br>program |
|---|---|---|
| 402 — | Block 1 | -Post Block<br>-Video BIOS<br>⋮ |
| 401 — | Block 0 | -Boot block<br>-ROM BIOS |

Fig.4B

| 415 — | Block 4 | -O/S, Application<br>program |
|---|---|---|
| 414 — | Block 3 | -Crisis data 및<br>utility Block |
| 413 — | Block 2 | -Post Block<br>-Video BIOS |
| 412 — | Block 1 | -Boot block<br>-ROM BIOS |
| 411 — | Block 0 | -Crisis Boot Code<br>Block |

APPARATUS AND METHOD FOR CRISIS RECOVERY

BACKGROUND OF THE INVENTION

1. Field of the Invention

The present invention relates to an apparatus and method for crisis recovery.

2. Background of the Related Art

Figure 1:
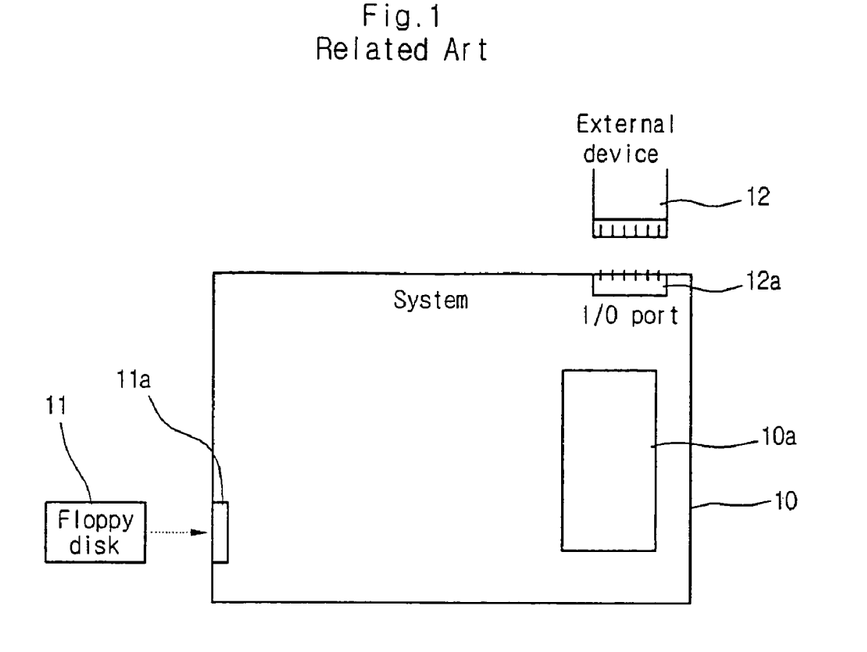
FIG. 1 is a block diagram illustrating a system where a crisis recovery is performed according to the related art.

FIG. 1 is a block diagram illustrating a system where a crisis recovery is performed according to the related art. As shown in FIG. 1, a system 10 includes a floppy disk drive (FDD) 11a, a key button 10a such as a HOT key, an input/output port 12a for providing a channel (communication link) to external devices, a floppy disk 11 and an external device 12 having an input/output port such as a USB port or a parallel port. The system is recovered from a disastrous failure, commonly called a system crisis or a system failure, by reading a crisis recovery routine from the floppy disk 11 inserted into the floppy disk driver 11a or the external 12 device through the input/output port 12a with activating the input keys for the crisis recovery.

Figure 2:
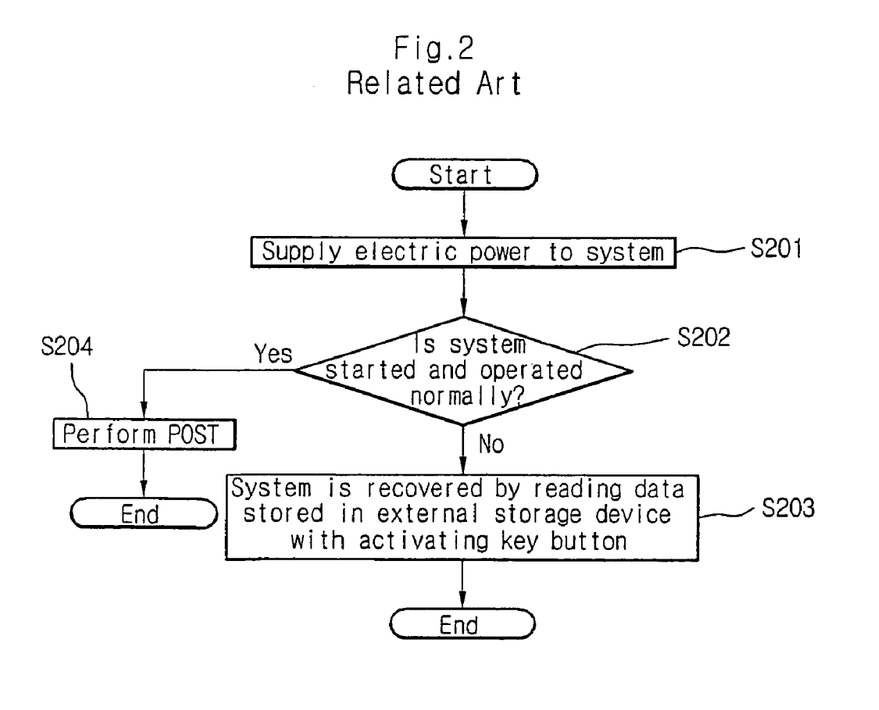
FIG. 2 is a flowchart showing a method for recovering a system from system crisis according to the related art.

FIG. 2 is a flowchart showing a method for recovering a system from system crisis according to the related art. As shown in FIG. 2, electric power is supplied to the system (block S201).

When the system is started and normally operated (block S202), the system performs a power-on self-test (POST) (block S204). On the contrary, if the system is not started or abnormally operated after supplying electric power to the system (block S202), the crisis recovery routine is performed by reading data from an external computer readable medium such as the floppy disk 11 or the Zip disk by using the floppy disk drive 11a or the external device 12 through a port 12a with activating the key button 10a (block S203).

As described above, the related art system and method for crisis recovery has various disadvantages. For example, the related art method for crisis recovery requires additional devices for performing the crisis recovery routine.

The above references are incorporated by reference herein where appropriate for appropriate teachings of additional or alternative details, features and/or technical background.

SUMMARY OF THE INVENTION

An object of the invention is to solve at least the above problems and/or disadvantages or to provide at least the advantages described hereinafter.

Another object of the present invention is to provide an apparatus and a method for crisis recovery that substantially obviates one or more problems caused by limitations or disadvantages of the related art.

Another object of the present invention is to provide an apparatus and a method for performing a crisis recovery routine by using a power button override.

Another object of the present invention is to provide an apparatus and a method for setting information of starting crisis recovery and storing the set information in a memory when a power button is activated for a predetermined time or a power button together with another button, such as volume up/down, backlight up/down is pressed.

Another object of the present invention is to provide an apparatus and a method for setting a signal representing entering of a crisis recovery mode at a volatile memory and resetting a system.

Another object of the present invention is to provide an apparatus and a method for performing a crisis recovery routine by using system memory storing information of starting a crisis recovery and a crisis recovery routine.

Another object of the present invention is to provide an apparatus and a method for performing a crisis recovery routine by using an internal memory storing information of starting a crisis recovery and a crisis recovery routine.

Another object of the present invention is to provide an apparatus and a method for recovering a read-only memory power-on self-test (ROM BIOS) by using information of starting crisis recovery stored in a memory and information of performing crisis recovery routine stored in an external storage device or a memory in a system, and performing operations of power on self-test (POST) based on the recovered ROM BIOS.

To achieve at least these objects and other advantages in a whole or in part and in accordance with the purpose of the invention, as embodied and broadly described herein, there is provided a portable computer system that includes a central processing unit and an apparatus configured to recover the system from system crisis, the apparatus includes an input device configured to generate a crisis signal and a flash memory configured to store a program performing a crisis recovering routine when the crisis signal is not set, wherein the program performing a crisis recovering routine is executed when the crisis signal is set.

To further achieve at least these objects and other advantages in a whole or in part with the purpose of the invention, as embodied and broadly described herein, there is provided a method for recovering a system from a computer system crisis, the method includes inputting a signal for turning the computer system on for a predetermined period of time, storing start information for starting an emergency recovering routine in a first memory when the signal is inputted for the predetermined period, setting the start information in a second memory, clearing the start information stored in the first memory and recovering a ROM BIOS by using the start information and at least one of emergency recovering information received from the system or an external storage device.

To further achieve at least these objects and other advantages in a whole or in part with the purpose of the invention, as embodied and broadly described herein, there is provided a method for recovering a system having a ROM BIOS, the method includes determining whether a start information for performing crisis recovering routine exists and recovering a ROM BIOS by using the start information and the emergency recovering routine stored in flash memory in the system when the start information for performing crisis recovering routine exists.

To further achieve at least these objects and other advantages in a whole or in part with the purpose of the invention, as embodied and broadly described herein, there is provided a method for recovering a system from a system crisis, the method includes selecting a power button for a predetermined time, performing at least one of operations of setting a crisis signature and storing the crisis signature and recovering the system by using the crisis signature and at least one of crisis recovering routine stored in the system or an external storage device.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Embodiments of apparatus and methods for crisis recovery according to the present invention can recover a basic input output system (BIOS) stored in a read-only memory (ROM), often called a ROM BIOS, before performing power-on self-test (POST). The POST is a set of routines included in the ROM BIOS that test various system components such as RAM, the disk drives, and the keyboard to determine whether they are properly connected and operating. After performing the POST, the control of the system is passed to an operating system boot loader.

Figure 3:
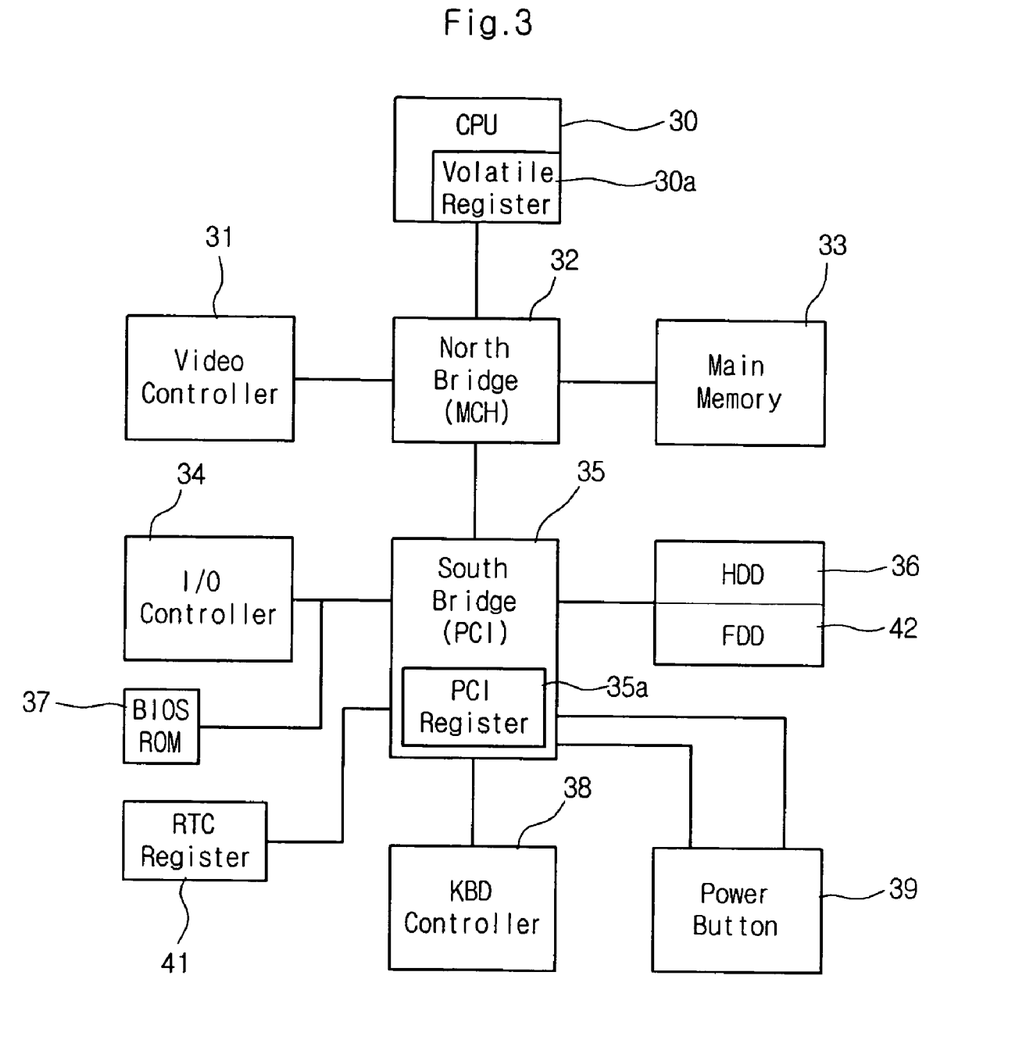
FIG. 3 is a block diagram illustrating a preferred embodiment of a computer system where a crisis recovery is performed according to the present invention.

FIG. 3 is a block diagram illustrating an embodiment of a computer system where a crisis recovery is performed according to the present invention. As shown in FIG. 3, the computer system can include a central processing unit (CPU) 30 having a register 30a as a first volatile memory for storing a Crisis flag, a North Bridge 32 as a first chip set coupled to the CPU 30 for controlling input/output of a system bus, a South Bridge 35 as a second chip set 35 for managing input/output of peripheral devices, a PCI register 35a included in the second chip set 35, a real-time clock (RTC) memory 41 as a second volatile memory where at least one of operations for setting the Crisis flag, clearing the Crisis flag or recovering the Crisis flag can be performed, a BIOS read only memory (ROM) 37, a power button 39 and an external storage device 42.

The BIOS ROM 37 can be a third memory for storing a basic input/output system (BIOS) performing booting sequences by recognizing, setting peripheral devices and finding an operating system of the computer system, and an emergency crisis recovery data for recovering the computer system from a system crisis. The power button 39 can be a power supplying device for performing a crisis recovering routine when the power button 39 is pressed during a predetermined time or a power button together with another button, such as volume up/down, backlight up/down is pressed, and the external storage device 42 can be for storing data for crisis recovering routine.

The computer system further can include a main memory 33, a video controller 31, an Input/Output controller 34, a keyboard controller 38, and a hard disk drive 36. A floppy disk drive can be the external storage device 42.

In the computer system, the South bridge 35 or the KBD controller 38 or the like can determine whether the power button 39 is activated. If the button is activated, the South bridge 35 or the KBD controller 38 can record a duration time spending for activating the power button. If the duration time exceeds a predetermined value, the Crisis flag is preferably set for performing the routine. By setting the Crisis flag, the ROM BIOS can be recovered according the crisis recovering routine (e.g., stored in the external storage device 42), and the POST operation can be performed according to recovered ROM BIOS.

Also, a crisis boot code, crisis data and utility for the crisis recovering routine may be stored in the BIOS ROM 37, which is a flash read only memory (ROM), according to embodiments of the present invention. Therefore, in one embodiment the computer system can be recovered from the system crisis by using the crisis boot code, the crisis data and the utility stored in the BIOS ROM 37 without using the external storage device.

Accordingly, the BIOS ROM 37 can include the crisis boot code, the flash utility (e.g., 4K bytes) and the BIOS (e.g., 4K bytes) in embodiments according to the present invention.

As shown in FIG. 3, the Crisis flag can be set in the second memory 41 at first, and then, can be stored in the first memory 30a. After storing the Crisis flag in the first memory 30a, the Crisis flag stored in the second memory 41 can be cleared. Further, a crisis active flag (e.g., PWRBTN_OVERRIDE_CRISIS_ACTIVE flag) can be set by activating the power button as long as the predetermined time when the Crisis flag is not set in the second memory.

Embodiments can be applied to a computer system having a BIOS ROM including a portable computer or a desktop computer. However, the present invention is not intended to be so limited.

Figure 4A:
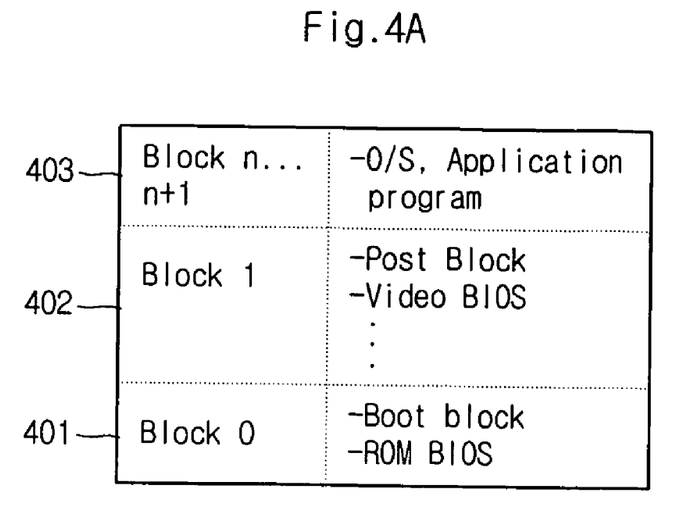
FIG. 4A is a diagram illustrating an exemplary file structure of a BIOS ROM in FIG. 3 when an emergency recovery routine is read from a floppy disk drive or an external storage device according to a preferred embodiment of the present invention.

FIG. 4A is a diagram illustrating an exemplary file structure of the BIOS ROM in FIG. 3 when a crisis recovering routine is read from a floppy disk drive or an external storage device according to an embodiment of the present invention. That is, FIG. 4A shows the file structure of the BIOS ROM 37 storing the Crisis data and the utility.

As shown in FIG. 4A, the BIOS ROM 37 can be divided into a plurality of blocks 401 to 403. However, the present invention is not intended to be so limited.

The block 401 can be a boot block for storing program to boot the computer system. The ROM BIOS can be stored in the block 401.

The block 402 can store data for performing operations after booting the computer system. The POST and video BIOS are preferably stored in the block 402.

In the blocks 403, application programs or operating system are preferably stored.

Figure 4B:
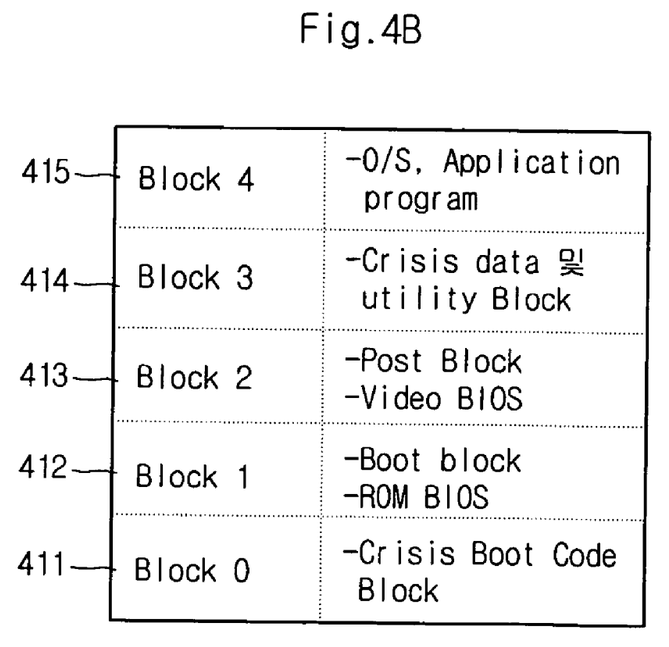
FIG. 4B is a diagram illustrating an exemplary file structure of a BIOS ROM in FIG. 3 when an emergency recovery routine is stored in the BIOS ROM.

FIG. 4B is a diagram illustrating an exemplary file structure of the BIOS ROM in FIG. 3 when an emergency recovery routine is stored in the BIOS ROM. As shown in FIG. 4B, the BIOS ROM 37 can be divided into a plurality of blocks 411 to 415.

The block 411 can be a crisis code block for storing the crisis code. The block 412 can be a boot block for storing the BIOS for booting the computer system. The block 413 can be a post block for storing codes for performing the POST operations, and the block 414 can be a Crisis data and the utility block for storing the crisis data and the utility block. The block 415 can store application programs and operating system (OS).

Accordingly, the ROM BIOS can be recovered by reading the crisis code from the block 411 and the crisis data and utility from the block 414.

Figure 5:
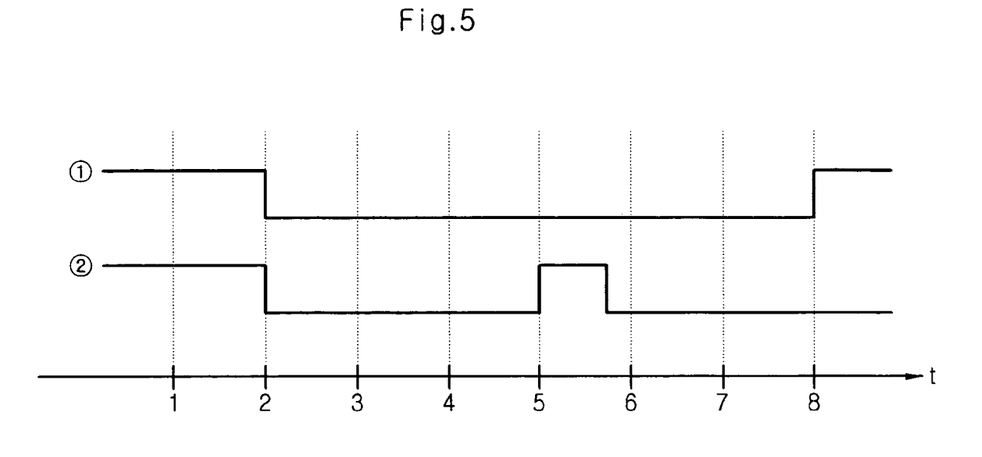
FIG. 5 is a timing diagram showing an exemplary first pulse wave representing activation of a power button and an exemplary second pulse wave representing that a computer system is operated after resetting the computer system when the power button is activated for a predetermined time.

FIG. 5 is an exemplary timing diagram showing a first pulse wave 1 representing activation of the power button 39 and a second pulse wave 2 representing the computer system can be operated after resetting the computer system when the power button is activated for a predetermined time. Accordingly, when the power button has been pressed or activated for more than 3 seconds or the power button together with another button, such as volume up/down, backlight up/down is pressed, the PWR_Button_Override_Crisis_Active flag can be set, the PCI register 35a can be reset and the power recycling is performed.

Figure 6:
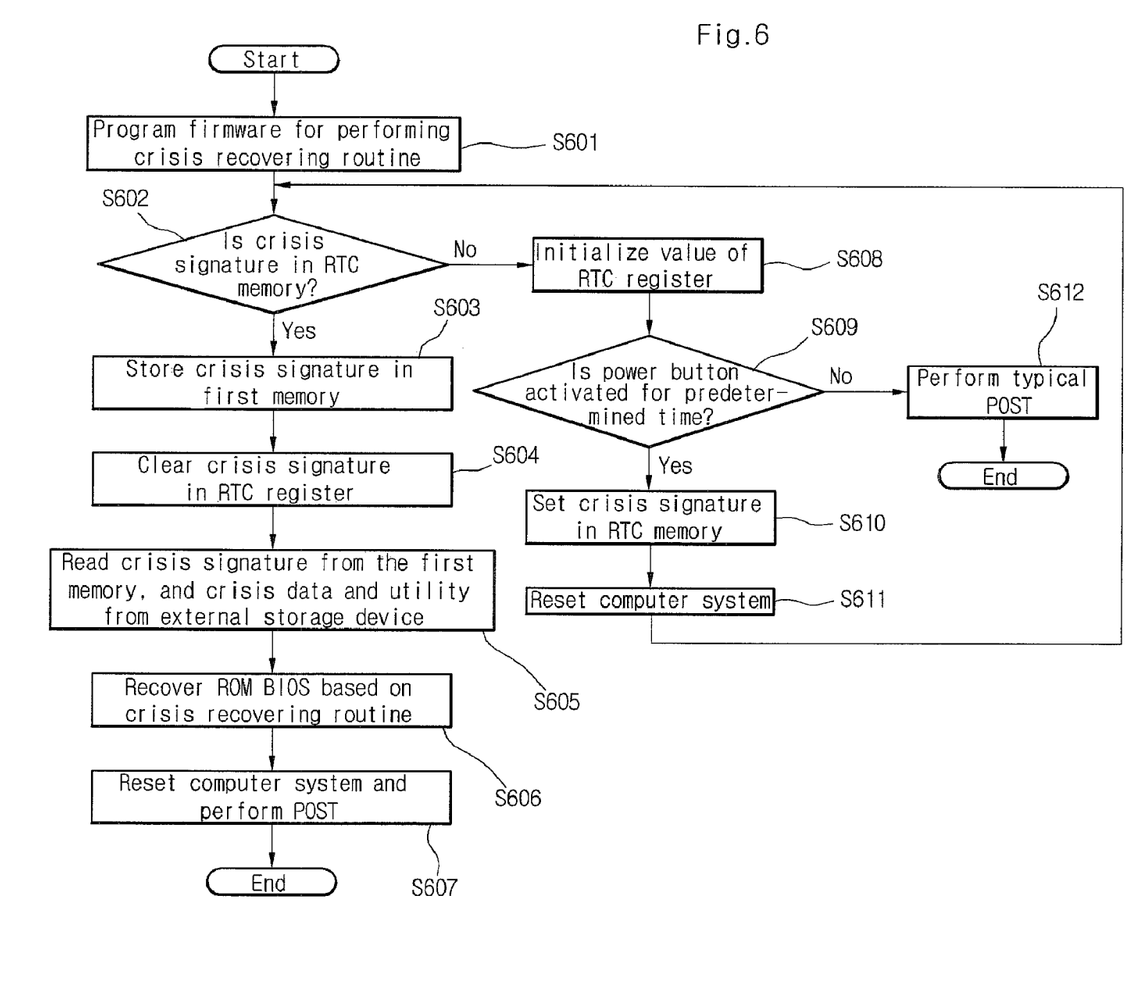
FIG. 6 is a flowchart showing a first preferred embodiment of a method for recovering a ROM BIOS by using an emergency recovering routine stored in an external storage device according to the present invention.

FIG. 6 is a flowchart showing a method for recovering a ROM BIOS according to an embodiment of the present invention. As shown in FIG. 6, the method for recovering a ROM BIOS can use a power button override and a crisis recovering routine stored in an external storage device. The embodiment of a method for recovering shown in FIG. 6 will be described using and can be applied to the apparatus shown in FIG. 3. However, the present invention is not intended to be so limited.

As shown in FIG. 6, a firmware can be programmed to perform a crisis recovering routine by setting a crisis signature in a prescribed location such as an RTC register 41 (block S601). It can determine whether an RTC register 41 includes the crisis signature as information of starting of crisis recovery for performing the emergency recovering routine (block S602).

If the RTC register 41 includes the crisis signature, the crisis signature can be stored in a first memory 30a (block S603). The crisis signature stored in the RTC register 41 can be cleared (block S604).

The ROM BIOS is preferably recovered by reading the crisis signature from the memory 30a, and crisis data and utility from a floppy disk drive or an external storage device, and the POST operation can be performed (blocks S605, S606, S607).

If the crisis signature is not set in the RTC memory 41, a value of the RTC register can be initialized (block S608). Then, it can be determined whether the power button has been pressed or activated for predetermined time or the power button together with another button, such as volume up/down, backlight up/down has been pressed (block S609).

If the power button has been pressed or activated for predetermined time or the power button together with another button, such as volume up/down, backlight up/down has been pressed, the crisis signature can be set at the RTC register and it is noticed to a user (blocks S610, S611). Then, the blocks S602 to S607 can be performed.

That is, after determining at (block S602), if the RTC register 41 includes the crisis signature, the crisis signature can be stored in a first memory 30a (block S603). The crisis signature stored in the RTC register 41 can be cleared (block S604).

The ROM BIOS is preferably recovered by reading the crisis signature from the memory 30a, and the crisis data and utility from a floppy disk drive and an external storage device (blocks S606, S607). Then, the POST operation can be performed (block S607).

In the meantime, after determining at block S609, the power button has not been pressed for the predetermined time, a typical POST operation can be performed (block S612). From blocks S606 and S612 the process can be completed.

Hereinafter, the method for recovering the ROM BIOS in the computer system will be added upon FIG. 6.

As described with respect to FIG. 6, the firmware can be programmed to perform the emergency recovering routine when the crisis signature or flag is set to a prescribed indicator, e.g., the RTC register. After then, the RTC register can be checked to determine whether the crisis signature is set.

If the crisis signature is not set, the crisis flag can be set at the RTC memory by pressing the power button (e.g., prescribed button) for predetermined time. Then, the computer system is preferably reset. However, if the power button has not been pressed for predetermined time, a typical POST operation is performed.

If the crisis signature is set to the RTC memory 41 or the PWR_BUTTON_OVERRIDE_CRISIS_ACTIVE flag is set to the RTC memory 41, the crisis signature can be copied to a second memory, e.g., the volatile register 30a. After the copying, the RTC memory 41 can be cleared.

After the clearing, the ROM BIOS can be recovered by reading information of emergency recovering routine stored in the external storage device 42 according to information of the crisis signature, and the POST operation is performed according to the recovered ROM BIOS.

The RTC memory 41 is cleared because of performing the POST operation after recovering the ROM BIOS. That is, it can be cleared to prevent repeatedly performing operations for recovering the emergency recovering routine.

Figure 7:
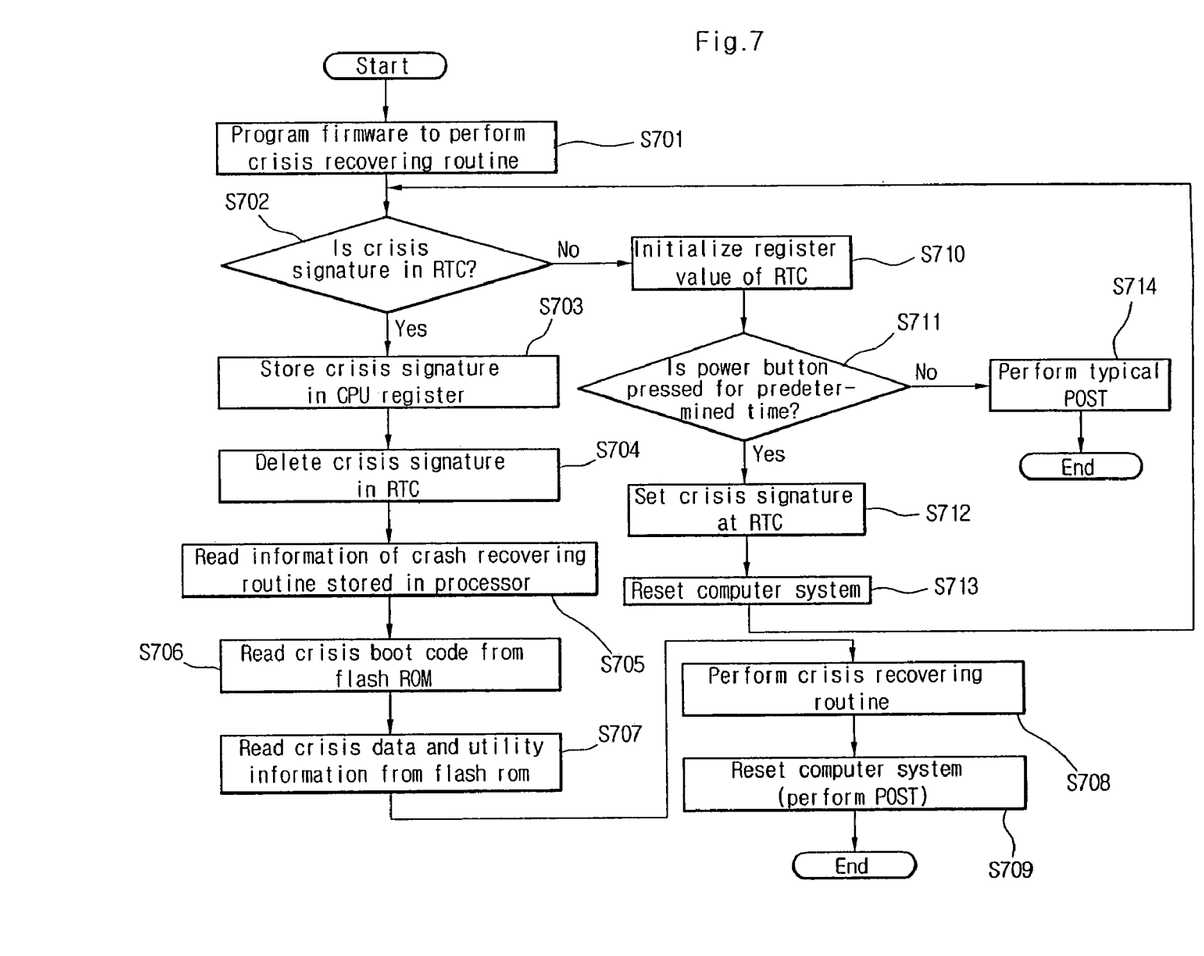
FIG. 7 is a flowchart showing another preferred embodiment of a method for recovering a ROM BIOS by using an emergency recovering routine such as a crisis code, crisis data and utility stored in a ROM BIOS according to the present invention.

FIG. 7 is a flowchart showing a method for recovering a ROM BIOS by using an emergency recovering routine such as a crisis code, crisis data and utility stored in a ROM BIOS according to another embodiment of the present invention. The embodiment of a method for recovering shown in FIG. 7 can be applied to and will be described using the apparatus of FIG. 3. However, the present invention is not intended to be so limited.

As shown in FIG. 7, a firmware can be programmed to perform an emergency recovering routine when a signature or a flag is set at a prescribed location such as a RTC register (block S701). It can be determined whether an RTC register 41 includes a crisis signature for performing the emergency recovering routine (block S702).

If the RTC register 41 includes the crisis signature, the crisis signature can be stored in a first memory 30*a* (block S703). The crisis signature stored in the RTC register 41 can be cleared (block S704).

The ROM BIOS can be recovered by reading the crisis signature from the first memory and the crisis data and utility from the ROM BIOS (blocks S705, S706, S707). The crisis boot code, crisis data and utility information read from the flash ROM can include over 1 MB of data. Then, the crisis recovering routine and the POST operation can be performed (blocks S708, S709).

If the crisis signature is not set in the RTC memory 41 (block S702), a value of the RTC register 41 can be initialized (block S710). It can be determined whether the power button has been pressed for predetermined time (block S711).

If the power button has been pressed for predetermined time, the crisis signature can be set at the RTC register 41, and it is preferably noticed to a user (blocks S712, S713). After then, blocks S702 to S709 can be performed.

For example, after determining in block S702 that the RTC register 41 includes the crisis signature, the crisis signature can be stored in a first memory 30*a* (block S703). The crisis signature stored in the RTC register 41 is preferably cleared (block S704).

The ROM BIOS can be recovered by reading the crisis signature and the crisis data and utility from the ROM BIOS, and the POST operation can be performed (blocks S705, S706, S707, S708, S709).

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments. Furthermore, for ease of understanding, certain method procedures may have been delineated as separate procedures; however, these separately delineated procedures should not be construed as necessarily order dependent in their performance. That is, some procedures may be able to be performed in an alternative ordering, simultaneously, etc.

As described above, embodiments of a method and apparatus for performing system recovery have various advantages. For example, embodiments of apparatus and methods according to the present invention can recover the ROM BIOS by setting a crisis signature at a prescribed memory (e.g., the RTC memory) when the prescribed or power button has been pressed for the predetermined time. Further, information of emergency recovering routine can be read from a BIOS ROM. In addition, the computer system can be recovered from the system crisis by setting the crisis signature by using a power-button override. Further, embodiments can recover the ROM BIOS without additional operations of key input or additional key inputs by setting the information of starting the emergency recovering routine in the memory when the power button is activated or pressed for the predetermined time. In addition, information of emergency recovering routine can be read from an external storage device.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method for recovering a system from a computer system crisis, the method comprising:
   inputting a signal, for turning the computer system on, for a predetermined period of time;
   storing start information, for starting an emergency recovering routine, in a first memory when the signal is inputted for the predetermined period of time;
   storing the start information in a second memory after storing the start information in the first memory;
   clearing the start information stored in the first memory after storing the start information in the second memory;
   recovering a ROM BIOS by using the start information stored in the second memory and an emergency recovering information received from the system or from an external storage device; and
   performing a power-on self (POST) operation in response to recovering the ROM BIOS.

2. The method of claim 1, wherein the signal is inputted for the predetermined period of time when the system is on.

3. The method of claim 1, wherein the emergency recovery information is stored in a flash memory of the system, and wherein the ROM BIOS is recovered without the external storage device.

4. The method of claim 1, wherein the first memory includes an RTC memory.

5. The method of claim 1, wherein the second memory includes a process memory.

6. A method for recovering a system having a ROM BIOS, the method comprising:
   determining whether a start information for performing a crisis recovering routine exists in the system;
   determining whether a predetermined button has been pressed for a predetermined time when the start information is determined to not be set;
   setting the start information when the predetermined button has been pressed for the predetermined time and the start information is determined to not be set;
   recovering the ROM BIOS by using the start information and the crisis recovering routine stored in a flash memory in the system when the start information for performing the crisis recovering routine is determined to exist in the system;
   setting the start information in an RTC memory by pressing the predetermined button for the predetermined time;
   storing the set start information in a process memory;
   clearing the start information from the RTC memory after storing the start information in the process memory; and
   recovering the ROM BIOS by using the start information stored in the process memory and a crisis data and a utility stored in the ROM BIOS.

7. The method of claim 6, further comprising:
storing a crisis recovering routine; and
recovering the ROM BIOS by using the start information, using an emergency recovering routine stored in said flash memory in the system.

8. The method of claim 6, further comprising resetting the system, wherein the predetermined button is a power button, and wherein the system is one of a laptop, a desktop, or a notebook computer.

9. The method of claim 8, further comprising performing a power-on self test (POST) operation when the predetermined button has been pressed for the predetermined time.

10. The method of claim 6, wherein a power-on self test (POST) operation is performed according to the recovered ROM BIOS, and wherein the ROM BIOS is recovered by using a crisis boot code and data stored in the ROM BIOS of a computer within the system.

11. The method of claim 6, wherein a crisis boot code, a flash utility or BIOS programs are in the ROM BIOS and the system is recovered by using the crisis boot code, the flash utility or the BIOS programs.

12. The method of claim 6, wherein the flash memory stores an emergency recovering routine when said start information for performing the crisis recovering routine does not exist in the system.

* * * * *